United States Patent
Medra et al.

(10) Patent No.: US 10,826,731 B2
(45) Date of Patent: Nov. 3, 2020

(54) EFFICIENT IMPLEMENTATION OF NOISE WHITENING POST-COMPENSATION FOR NARROWBAND-FILTERED SIGNALS

(71) Applicants: Ahmed Mohamed Ibrahim Medra, Kanata (CA); Hossein Najafi, Kanata (CA); Zhuhong Zhang, Ottawa (CA)

(72) Inventors: Ahmed Mohamed Ibrahim Medra, Kanata (CA); Hossein Najafi, Kanata (CA); Zhuhong Zhang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/146,079

(22) Filed: Sep. 28, 2018

(65) Prior Publication Data
US 2020/0106648 A1    Apr. 2, 2020

(51) Int. Cl.
*H04L 25/03* (2006.01)
*H04B 1/10* (2006.01)

(52) U.S. Cl.
CPC ..... *H04L 25/03299* (2013.01); *H04B 1/1036* (2013.01); *H04L 25/03292* (2013.01); *H04L 25/03993* (2013.01)

(58) Field of Classification Search
CPC ......... H04L 25/03292; H04L 25/03299; H04L 25/03993; H04B 1/1036
See application file for complete search history.

(56) References Cited

U.S. PATENT DOCUMENTS

| | | | |
|---|---|---|---|
| 5,345,476 A | 9/1994 | Tsujimoto | |
| 5,930,296 A * | 7/1999 | Kot | H04L 25/03057 375/233 |
| 8,542,724 B1 * | 9/2013 | Blackmon | H04L 25/03057 375/229 |
| 8,731,413 B1 | 5/2014 | Dave et al. | |

(Continued)

FOREIGN PATENT DOCUMENTS

CN    101989965 A    3/2011

OTHER PUBLICATIONS

C. A. Belfiore and J. H. Park, "Decision feedback equalization," in Proceedings of the IEEE, vol. 67, No. 8, pp. 1143-1156, Aug. 1979.

(Continued)

*Primary Examiner* — David B Lugo (57) ABSTRACT

Apparatus and methods are provided for noise-whitening post-compensation in a receiver. A first apparatus includes a first whitening filter configured to filter a received signal comprising symbols to generate a first filtered signal. The first apparatus further includes a first decision feedback equalizer having an input coupled to an output of the first whitening filter to receive the first filtered signal. The first decision feedback equalizer is configured to apply decision feedback equalization to the first filtered signal to generate estimates for the symbols of the received signal. A second apparatus includes a decision device configured to generate a symbols decision based on a received signal comprising symbols, a noise predictor configured to predict noise in the received signal, and a subtractor configured to subtract the (Continued)

predicted noise from the received signal to generate a symbols estimate.

17 Claims, 7 Drawing Sheets

(56) References Cited

U.S. PATENT DOCUMENTS

| | | | | |
|---|---|---|---|---|
| 2002/0126778 A1* | 9/2002 | Ojard | ............... | H04B 1/1036 375/346 |
| 2002/0131488 A1* | 9/2002 | Allpress | ............ | H04L 25/03057 375/233 |
| 2002/0176524 A1* | 11/2002 | Popper | ............... | G11B 20/22 375/346 |
| 2005/0018794 A1* | 1/2005 | Tang | ............... | H04L 25/03171 375/341 |
| 2007/0153930 A1* | 7/2007 | Reid | ............... | H04L 25/0228 375/260 |
| 2017/0041175 A1* | 2/2017 | Dyson | ............... | H04L 1/0045 |

OTHER PUBLICATIONS

L. Bahl, J. Cocke, F. Jelinek and J. Raviv, "Optimal decoding of linear codes for minimizing symbol error rate (Corresp.)," in IEEE Transactions on Information Theory, vol. 20, No. 2, pp. 284-287, Mar. 1974.

G. D. Forney, "The Viterbi algorithm," in Proceedings of the IEEE, vol. 61, No. 3, pp. 268-278, Mar. 1973.

S. ten Brink, "Convergence behavior of iteratively decoded parallel concatenated codes," IEEE Trans. Commun., vol. 49, No. 10, pp. 1727-1737, Oct. 2001.

S. ten Brink ,"Designing iterative decoding schemes with the extrinsic information transfer chart," AEU Int. J. of Electronics and Commun, vol. 54, No. 6, pp. 389-398, Nov. 2000.

R. Bos, S. de Waele and P. M. T. Broersen, "Autoregressive spectral estimation by application of the Burg algorithm to irregularly sampled data," in IEEE Transactions on Instrumentation and Measurement, vol. 51, No. 6, pp. 1289-1294, Dec. 2002.

P. Vaidyanathan, "The Theory of Linear Prediction", Synthesis Lectures on Signal Processing. 2(1), Jan. 2007.

J. K. Nelson, A. C. Singer, U. Madhow and C. S. McGahey, "BAD: bidirectional arbitrated decision-feedback equalization," in IEEE Transactions on Commun., vol. 53, No. 2, pp. 214-218, Feb. 2005.

F. Tosato and P. Bisaglia, "Simplified soft-output demapper for binary interleaved COFDM with application to HIPERLAN/2," 2002 IEEE International Conference on Communications. Conference Proceedings. ICC 2002, pp. 664-668 vol. 2.

* cited by examiner

EFFICIENT IMPLEMENTATION OF NOISE WHITENING POST-COMPENSATION FOR NARROWBAND-FILTERED SIGNALS

FIELD OF THE INVENTION

This disclosure relates to systems and methods for equalization of distorted signals, and in particular embodiments to noise whitening post-compensation for narrowband-filtered signals.

BACKGROUND

A signal that is transmitted on a channel in a communication system is typically subject to distortion. There are numerous possible sources of distortion in the channel, which may include optical and electrical components. For example, distortion may result from bandwidth-limited components in the channel (e.g., a wavelength selective switch (WSS)), which have passbands that cannot accommodate the entire bandwidth of the signal. The frequency spectrum of the signal may be cut-off or filtered due to these bandwidth-limited components. Another possible source of distortion is due to signaling at a rate that violates Nyquist criterion for interference-free reception, or what is known as Faster than Nyquist (FTN) signaling. In contrast to channel distortion, intentional FTN distortion can be known a-priori at the receiver side.

Dispersive optical and electrical components are another potential source of distortion. Components in which the phase velocity of the signal is dependent on frequency exhibit chromatic dispersion (CD), and components in which the phase velocity of the signal is dependent on polarization exhibit polarization mode dispersion (PMD). CD and PMD may spread a signal as it propagates, leading to distortion.

Regardless of the source of distortion to the signal, the result may include spreading of the signal in the time-domain. This spreading leads to symbols in the signal overlapping in time with adjacent symbols, which is referred to as inter-symbol interference (ISI). Similar to other sources of interference, ISI typically degrades the performance of a communication system.

Equalization may be implemented on the receiver side to reverse the effects of distortion, and therefore reduce the ISI introduced by the channel. Equalization may be achieved using linear equalizers, such as time-domain (TD) or frequency domain (FD) multiple-input multiple output (MIMO) equalizers. Linear equalizers are generally simple to implement and their outputs can be efficiently used to estimate the channel impairments and equalize the ISI introduced by the channel. On the other hand, linear equalizers will also affect the noise associated with the signal. In some cases, the noise in the signal is amplified. A linear equalizer will affect noise at certain frequencies differently than noise at other frequencies. For example, noise amplification in the signal may be frequency-dependent. This is often referred to as noise coloring, as the noise can no longer be considered white noise. Noise coloring is detrimental to the performance of the receiver, and may lead to an increase in bit-error-rate (BER). This is why it is desirable to implement a second equalization stage or post-compensation stage to deal with the problem of noise correlation.

SUMMARY

According to one aspect of the present disclosure, there is provided an apparatus for noise-whitening post-compensation, the apparatus comprising: a first whitening filter configured to filter a received signal comprising symbols to generate a first filtered signal; and a first decision feedback equalizer having an input coupled to an output of the first whitening filter to receive the first filtered signal, the first decision feedback equalizer configured to apply decision feedback equalization (DFE) to the first filtered signal to generate estimates for the symbols of the received signal.

In some embodiments, the first decision feedback equalizer comprises: a feed-forward filter (FFF) having an input and an output; a first combiner having a first input, a second input, and an output; a first decision device having an input and an output; and a feed-back filter (FBF) having an input and an output, wherein: the input of the FFF is coupled to the output of the first whitening filter to receive the first filtered signal generated by the first whitening filter; the first input of the first combiner is coupled to the output of the FFF to receive a second filtered signal generated by the FFF; the second input of the first combiner is coupled to the output of the FBF to receive a third filtered signal generated by the FBF; the input of the first decision device is coupled to the output of the first combiner to receive a first symbols estimate generated by the first combiner; the input of the FBF is coupled to the output of the first decision device to receive a second symbols estimate generated by the first decision device; the FFF is configured to feed-forward filter the first filtered signal to generate the second filtered signal; the first combiner is configured to combine the second filtered signal generated by the FFF and the third filtered signal generated by the FBF to generate the first symbols estimate; the first decision device is configured to generate the second symbols estimate based on the first symbols estimate; and the FBF is configured to filter the second symbols estimate to generate the third filtered signal.

In some embodiments, the first decision device is a soft decision device configured to generate at least one log likelihood ratio.

In some embodiments, an output of the first decision feedback equalizer may be coupled to either the output of the first decision device to output the second symbols estimate or the output of the first combiner to output the first symbols estimate. In some embodiments, the apparatus further comprises: a first reverser configured to reverse an order of the symbols of the received signal to generate a reversed signal; a second whitening filter having an input coupled to an output of the first reverser to receive the reversed signal, the second whitening filter configured to filter the reversed signal to generate a filtered reversed signal; a second decision feedback equalizer having an input coupled to an output of the second whitening filter to receive the filtered reversed signal, the second decision feedback equalizer configured to apply DFE to the filtered reversed signal to generate a reversed symbols estimate for the symbols of the reversed signal; a second reverser having an input coupled to an output of the second decision feedback equalizer to receive the reversed symbols estimate, the second reverser configured to reverse an order of the symbols of the reversed symbols estimate to generate a third symbols estimate; a second combiner having a first input coupled to an output of the second reverser to receive the third symbols estimate and having a second input coupled to the output of the first decision feedback equalizer to receive either the second symbols estimate or the first symbols estimate, the second combiner configured to combine the third symbols estimate and either the second symbols estimate or the first symbols estimate to generate a fourth symbols estimate.

In some embodiments, the apparatus further comprises: a noise predictor having an input coupled to the output of the second decision device to receive the symbols decision, the noise predictor configured to predict noise in the received signal; and a first subtractor having a input coupled to an output of the noise predictor to receive the predicted noise, the first subtractor configured to subtract the predicted noise from the received signal to generate a fifth symbols estimate.

In some embodiments, the noise predictor comprises: a second decision device having an input coupled to the output of the second combiner, the second decision device configured to generate a symbols decision based on the fourth symbols estimate; a second subtractor having an input coupled to an output of the second decision device to receive the symbols decision, the second subtractor configured to subtract he symbols decision from the received signal to generate noise estimates; and a linear predictive coder having an input coupled to an output of the second subtractor to receive the noise estimates, the linear predictive coder having an output coupled to the output of the noise predictor and configured to apply linear predictive coding (LPC) to the noise estimates to generate the predicted noise.

In some embodiments, the linear predictive coder is further configured to calculate: $\tilde{z}[n]=-q_1\bar{z}[n-1]-q_2\bar{z}[n-2] \ldots -q_M\bar{z}[n-M]+e[n]$, wherein $\tilde{z}$ denotes the predicted noise, $\bar{z}$ denotes the noise estimates, n denotes a symbol index for the symbols of the received signal, $q=q_1, q_2 \ldots q_M$ denotes a prediction filter, and e denotes a prediction error.

In some embodiments, the first whitening filter and the prediction filter are based on same filter taps.

In some embodiments, the apparatus further comprises a soft-demapper having an input coupled to an output of the first subtractor to receive the fifth symbols estimate, the soft-demapper configured to soft-demap the fifth symbols estimate to generate a first set of log likelihood ratios (LLRs) for the fifth symbols estimate.

In some embodiments, the apparatus further comprises a forward error correction (FEC) decoder having an input coupled to an output soft-demapper to receive the first set of LLRs, the FEC decoder configured to FEC decode the first set of LLRs to generate a second set of LLRs.

In some embodiments, the apparatus further comprises a regenerator having an input coupled to an output of the FEC decoder to receive the second set of LLRs, the regenerator configured to regenerate the symbols of the received signal using the second set of LLRs.

In some embodiments, the apparatus further comprises a decoding loop having an input coupled to the output of the FEC decoder to receive the second set of LLRs, the decoding loop being configured to perform one or more iterations of decoding.

In some embodiments, the decoding loop comprises an output coupled to an input of the first decision feedback equalizer, the first decision feedback equalizer being configured to receive the second set of LLRs.

In some embodiments, the decoding loop comprises an output coupled to an input of an equalizer different from the first decision feedback equalizer, the equalizer different from the first decision feedback equalizer being configured to receive the second set of LLRs.

According to another aspect of the present disclosure, there is provided an apparatus for noise-whitening post-compensation, the apparatus comprising: a decision device configured to generate a symbols decision based on a received signal comprising symbols; a noise predictor having an input coupled to an output of the decision device to receive the symbols decision, the noise predictor configured to predict noise in the received signal; and a subtractor having a input coupled to an output of the noise predictor to receive the predicted noise, the subtractor configured to subtract the predicted noise from the received signal to generate a symbols estimate.

In some embodiments, the noise predictor comprises: a second subtractor having an input coupled to the input of the noise predictor to receive the symbols decision, the second subtractor configured to subtract the symbols decision from the received signal to generate noise estimates; and a linear predictive coder having an input coupled to an output of the second subtractor to receive the noise estimates, the linear predictive coder having an output coupled to the output of the noise predictor and configured to apply linear predictive coding (LPC) to the noise estimates to generate the predicted noise.

In some embodiments, the linear predictive coder is further configured to calculate: $\tilde{z}[n]=-q_1\bar{z}[n-1]-q_2\bar{z}[n-2] \ldots -q_M\bar{z}[n-M]+e[n]$, wherein $\tilde{z}$ denotes the predicted noise, $\bar{z}$ denotes the noise estimates, n denotes a symbol index for the symbols of the received signal, $q=q_1, q_2 \ldots q_M$ denotes a prediction filter, and e denotes a prediction error.

In some embodiments, the apparatus further comprises a soft-demapper having an input coupled to an output of the first subtractor to receive the symbols estimate, the soft-demapper configured to soft-demap the symbols estimate to generate a first set of log likelihood ratios (LLRs) for the symbols estimate.

In some embodiments, the apparatus further comprises a forward error correction (FEC) decoder having an input coupled to an output soft-demapper to receive the first set of LLRs, the FEC decoder configured to FEC decode the first set of LLRs to generate a second set of LLRs.

In some embodiments, the apparatus further comprises a regenerator having an input coupled to an output of the FEC decoder to receive the second set of LLRs, the regenerator configured to regenerate the symbols of the received signal using the second set of LLRs.

According to yet another aspect of the present disclosure, there is provided a method for noise whitening post-compensation in a receiver, the method comprising: applying a whitening filter to a received signal comprising symbols to generate a first filtered signal; applying decision feedback equalization (DFE) to the first filtered signal to generate estimates for the symbols of the received signal.

In some embodiments, applying DFE to the first filtered signal comprises: feed-forward filtering the first filtered signal to generate a second filtered signal; combining the second filtered signal and a third filtered signal to generate a first symbols estimate; generating a second symbols estimate based on the first symbols estimate; and feed-back filtering the second symbols estimate to generate the third filtered signal.

In some embodiments, generating the second symbols estimate based on the first symbols estimate comprises generating a soft symbol decision based on the first symbols estimate.

In some embodiments, generating the soft symbols decision based on the first symbols estimate comprises generating at least one log likelihood ratio.

In some embodiments, the whitening filter is a first whitening filter, the method further comprising: reversing an order of the symbols of the received signal to generate a reversed signal; applying a second whitening filter to the reversed signal to generate a filtered reversed signal; applying DFE to the filtered reversed signal to generate a reversed symbols estimate for the symbols of the reversed signal;

reversing an order of the symbols of the reversed symbols estimate to generate a third symbols estimate; combining the third symbols estimate and either the second symbols estimate or the first symbols estimate to generate a fourth symbols estimate.

In some embodiments, the method further comprises predicting noise in the received signal; and subtracting the predicted noise from the received signal to generate a fifth symbols estimate.

In some embodiments, predicting the noise in the received signal comprises: generating a symbols decision based on the fourth symbols estimate; subtracting the symbols decision from the received signal to generate noise estimates; and applying linear predictive coding (LPC) to the noise estimates to generate the predicted noise.

In some embodiments, applying LPC to the noise estimates comprises calculating: $\tilde{z}[n]=-q_1\bar{z}[n-1]-q_2\bar{z}[n-2]\ldots-q_M\bar{z}[n-M]+e[n]$, wherein $\tilde{z}$ denotes the predicted noise, $\bar{z}$ denotes the noise estimates, n denotes a symbol index for the symbols of the received signal, $q=q_1, q_2 \ldots q_M$ denotes a prediction filter, and e denotes a prediction error.

In some embodiments, applying a whitening filter to the received signal comprises generating filter taps, and applying LPC to the noise estimates comprises generating the prediction filter based on the filter taps.

In some embodiments, the method further comprises: soft-demapping of the fifth symbols estimate to generate a first set of log likelihood ratios (LLRs) for the fifth symbols estimate.

In some embodiments, the method further comprises forward error correction (FEC) decoding the first set of LLRs to generate a second set of LLRs.

In some embodiments, the method further comprises regenerating the symbols of the received symbol using the second set of LLRs.

In some embodiments, FEC decoding the first set of LLRs to generate the second set of LLRs comprises performing one or more iterations of a decoding loop.

In some embodiments, performing each of the one or more iterations comprises sending the second set of LLRs as a-priori information for a subsequent iteration of the DFE applied to the first filtered signal.

In some embodiments, performing each of the one or more iterations comprises sending the second set of LLRs as a-priori information for a subsequent iteration of equalization different from the DFE applied to the first filtered According to yet another aspect of the present disclosure, there is provided a method for noise whitening post-compensation in a receiver, the method comprising: generating a symbols decision based on a received signal comprising symbols; predicting noise in the received signal based on the symbols decision; and subtracting the predicted noise from the received signal to generate a symbols estimate.

In some embodiments, generating the symbols decision based on the received symbol comprises generating a soft symbol decision based on the received signal.

In some embodiments, generating the symbols decision based on the received symbol comprises generating a hard symbol decision based on the received signal.

In some embodiments, wherein predicting the noise in the received signal comprises: subtracting the symbols decision from the received signal to generate noise estimates; and applying linear predictive coding (LPC) to the noise estimates to generate the predicted noise.

In some embodiments, applying LPC to the noise estimates comprises calculating: $\tilde{z}[n]=-q_1\bar{z}[n-1]-q_2\bar{z}[n-2]\ldots-q_M\bar{z}[n-M]+e[n]$, wherein $\tilde{z}$ denotes the predicted noise, $\bar{z}$ denotes the noise estimates, n denotes a symbol index for the symbols of the received signal, $q=q_1, q_2 \ldots q_M$ represents a prediction filter, and e represents a prediction error.

In some embodiments, applying a whitening filter to the received signal comprises generating filter taps, and applying LPC to the noise estimates comprises generating the prediction filter based on the filter taps.

In some embodiments, the method further comprise soft-demapping of the symbols estimate to generate a first set of log likelihood ratios (LLRs) for the symbols estimate.

In some embodiments, the method further comprises forward error correction (FEC) decoding the first set of LLRs to generate a second set of LLRs.

In some embodiments, the method further comprises regenerating the symbols of the received symbol using the second set of LLRs.

In some embodiments, FEC decoding the first set of LLRs to generate the second set of LLRs comprises performing one or more iterations of a decoding loop.

In some embodiments, performing each of the one or more iterations comprises sending the second set of LLRs as a-priori information for a subsequent iteration of predicting noise in the received signal.

In some embodiments, performing each of the one or more iterations comprises sending the second set of LLRs as a-priori information for a subsequent iteration of equalization different from LPC.

BRIEF DESCRIPTION OF THE DRAWINGS

Embodiments will now be described in detail with reference to the accompanying diagrams, in which.

DETAILED DESCRIPTION

A solution to the aforementioned problem of noise coloring involves post-compensation through the use of a whitening filter followed by a post-compensation (non-linear) equalizer. Post-compensation is shown in FIG. 1, which is a block diagram illustrating an example of a receiver implementing a post-compensation equalization process at the output of a linear (TD or FD MIMO) equalizer.

Figure 1:
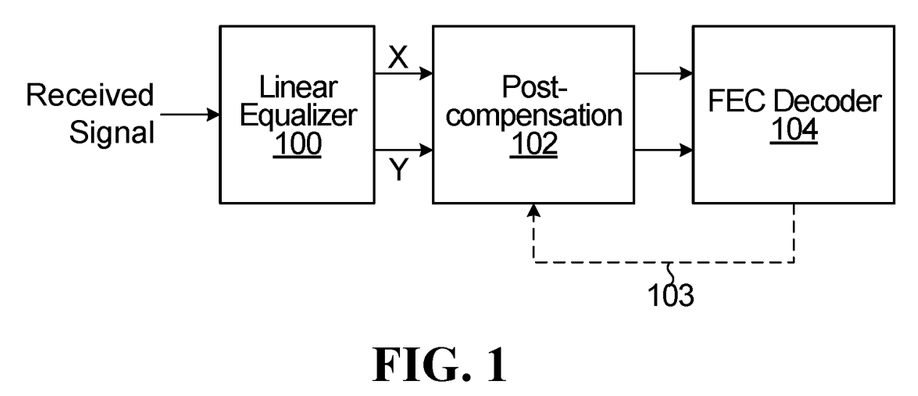
FIG. 1 is a block diagram illustrating an example of a receiver implementing a post-compensation equalization process at the output of a linear equalizer.

FIG. 1 illustrates a received signal input into a linear equalizer 100. At the output of the linear equalizer 100, an X polarization component and a Y polarization component are produced and input into a post-compensation block 102. The outputs of the post-compensation block 102 are then input into a forward error correction (FEC) decoder 104. Optionally, the output of the FEC decoder 104 may be fed back into the post-compensation block 102, forming an FEC decoding loop as indicated at 103 in FIG. 1. The linear equalizer 100, post-compensation block 102 and the FEC decoder 104 may be implemented in whole or in part in hardware, firmware, one or more components that execute software, or some combination thereof. The equalizer of FIG. 1 may be part of a receiver unit.

The received signal in FIG. 1 includes a series of transmitted symbols, possibly filtered by the channel, and subjected to noise. In some embodiments, the received signal may be produced by the coherent detection of an optical signal at a receiver. In other embodiments, the received signal may be produced by the detection of a microwave signal at a receiver. Although the X polarization component and the Y polarization component are shown separately in FIG. 1, these components may be instead treated together.

The linear equalizer 100 equalizes the received signal, which may reduce the associated ISI due to distortion. In some embodiments, the linear equalizer 100 is a 2×2 MIMO (or Butterfly) equalizer. However, other embodiments may use other types of linear equalizers. In some implementations of FIG. 1, the received signal may be formatted as two orthogonal polarization components (X and Y polarizations), wherein each component may comprise two orthogonal phase components (an in-phase component I and a quadrature-phase component Q). The linear equalizer 100 separates the received signal into the X polarization component and the Y polarization component. Separating the X polarization component and Y polarization component may reduce ISI caused by PMD introduced by the channel. Other embodiments where the received signal is treated as a single component (i.e., not formatted as two orthogonal polarization components) are also contemplated.

As discussed above, the linear equalizer 100 causes amplification and coloring of the noise in the X polarization component and the Y polarization component. Unless appropriate correction is applied, this amplified and colored noise may significantly degrade the BER performance of the system, requiring a higher SNR (signal-to-noise ratio) to achieve error-free post-FEC decoding.

The signal at the output of the linear equalizer 100 may be denoted by $r_p[n]$, where p refers to the polarization of the signal (X or Y), and n is the symbol index of the received signal. The variable $r_p[n]$ may be expressed as:

$$r_p[n]=s_p[n]+\bar{z}[n]. \quad (1)$$

Here, $s_p[n]$ is the transmitted symbol and $\bar{z}[n]$ is the colored additive noise. The colored additive noise may also be referred to as correlated additive noise.

To address the issue of noise coloring, the post-compensation block 102 is implemented, which includes a filter followed by a post-compensation equalizer. In some embodiments, the filter in the post-compensation block 102 is a whitening filter. The filter in the post-compensation block 102 reduces the coloring of noise in the X polarization component and the Y polarization component.

Following the filtering stage in the post-compensation block 102, the colored noise is whitened. However, the symbols in the signal are now correlated as a result of the filtering. This correlation results in distortion of the X polarization component and the Y polarization component of the signal, leading to ISI. The purpose of the post-compensation non-linear equalizer in the post-compensation block 102 is to equalize the ISI due to this correlation, without amplifying or coloring the whitened noise as a result of filtering. As a result, the overall detection and decoding of the received signal is improved.

In some embodiments, the equalization in the post-compensation block 102 results in no noise enhancement or minimal noise enhancement.

Following the equalization in the post-compensation block 102, the X polarization component and the Y polarization component are forwarded to the FEC decoder 104 for decoding. The FEC decoder decodes the X polarization component and the Y polarization component to produce decoded bits. In some embodiments, both the X and Y polarizations can be jointly encoded at the transmitter and decoded at the receiver. The FEC decoding may correct for detection errors of the received signal.

When using the optional FEC decoding loop 103, the output of the post-compensation block 102 is sent to the FEC decoder 104 as a-priori information. Following an iteration of decoding, the FEC decoder 104 provides output or extrinsic information in terms of log-likelihood ratios (LLRs) to the post-compensation equalizer of the post-compensation block 102 as a-priori information for the next iteration of equalization. This process is known as turbo-equalization.

Post-compensation, such as that performed in the post-compensation block 102, will now be discussed in greater detail.

Figure 2:
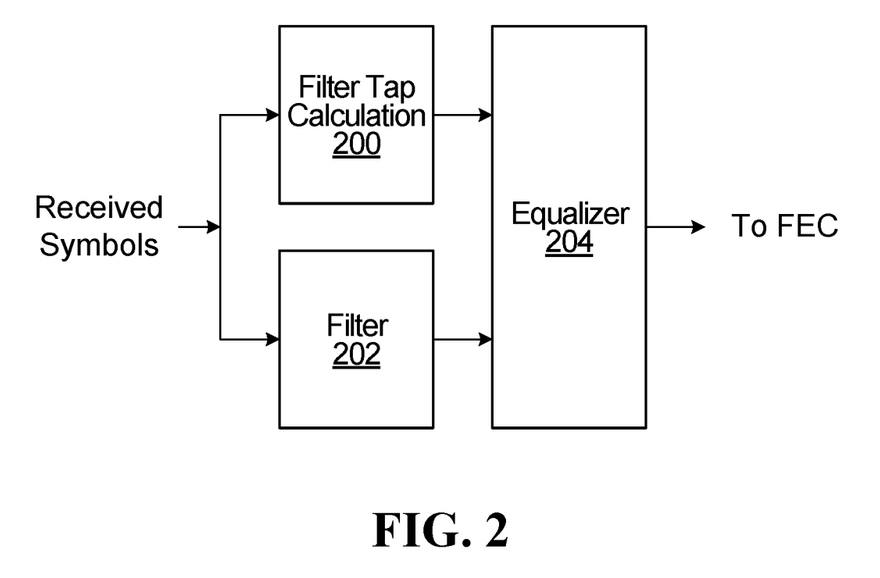
FIG. 2 is a block diagram illustrating an example of a post-compensator.

Referring to FIG. 2, shown is a block diagram illustrating an example of a post-compensator. FIG. 2 includes received symbols, a filter tap calculation block 200, a filter 202 and an equalizer 204. The received symbols are sent to the filter tap calculation block 200 and the filter 202. The output from the filter tap calculation block 200 is also sent to the filter 202. The outputs of the filter tap calculation block 200 and the filter 202 are sent to the equalizer 204. The output of the equalizer 204 is then sent to an FEC decoder. The filter tap calculation block 200, filter 202 and equalizer 204 may be implemented in whole or in part in hardware, firmware, one or more components that execute software, or some combination thereof. The post-compensator of FIG. 2 may be part of an equalizer. In some embodiments, the post-compensation block 102 of FIG. 1 includes the post-compensator illustrated in FIG. 2.

The received symbols in FIG. 2 include colored noise, and may include one polarization or two polarizations. These received symbols may be received from a linear equalizer, such as linear equalizer 100 illustrated in FIG. 1. In some embodiments, the received symbols relate to narrowband-filtered signals.

The filter tap calculation block 200 calculates filter taps, which characterize the quality of the channel, the transmitter and/or the receiver that the signal carrying the received symbols has traversed. This channel, transmitter and/or receiver may be considered an effective channel that the signal carrying the received symbols has traversed. As noted above, this effective channel may include a linear equalizer. The filter taps also represent the noise coloring associated with the received symbols. The filter taps are denoted as $g=g_1, g_2 \ldots g_M$, where M denotes the filter length. The filter taps may also be considered filter coefficients.

In some embodiments, the computation of these filter taps is based on pilot signals, which are signals that are known on the receiver side as well as on the transmitter side. The filter tap calculation may be performed using a variety of methods, including autoregressive spectrum estimation and adaptive methods such as least mean square.

In some implementations of FIG. 2, the number of taps may be chosen to improve efficiency according to an estimated pattern, such that any tap value greater than a pre-defined percentage of the main tap is persevered. The filter taps may be real-valued or complex-valued.

In some implementations of FIG. 2, the filter taps are calculated only once. However, in other implementations, the filter taps are re-calculated periodically.

Once the filter taps are calculated, they are sent to the filter 202. In some embodiments, the filter 202 is a whitening filter used to whiten the colored noise associated with the received symbols. However, as discussed above, filtering the received symbols may lead to the filtered symbols becoming correlated.

The filtered signal output from the filter 202 is denoted as $a_p[n]$, which may be expressed as:

$$a_p[n]=\sum_{m=1}^{M} g[m] s_p[n-m]+\hat{z}[n]. \quad (2)$$

Here, $\hat{z}[n]$ is the white additive noise produced by filtering the colored noise $\bar{z}[n]$ with the filter 202.

The equalizer 204 may be considered a post-compensation equalizer, a non-linear equalizer, a post-compensation non-linear equalizer, or a second stage equalizer. Several different equalization methods may be used by the equalizer 204. In one example, the equalizer 204 uses a BCJR (Bahl, Cocke, Jelinek and Raviv) method, which is the optimal symbol by symbol detector. In another example, the equalizer 204 uses a maximum likelihood sequence estimation (MLSE) method, such as a Viterbi algorithm or a soft output Viterbi algorithm (SOYA). The MLSE method is the optimal sequence detector. However, both the BCJR and MLSE methods may suffer from a large computation complexity.

The BCJR and MLSE methods, as well as the modified versions of the BCJR and MLSE methods including reduced-state and bi-directional methods, consist of a trellis structure. The computation complexity of the trellis increases exponentially as the symbol constellation size (e.g., QPSK (quadrature phase shift keying), 64-QAM (quadrature amplitude modulation)) and the filter length increases. In addition, the trellis may introduce significant delays. These issues make the BCJR and MLSE methods difficult to implement in hardware when resources are limited, even with parallelization of the trellis structures. Resources that are limited in hardware equalizer implementations may include power, cooling capacity and number of gates.

The computational complexity and delays associated with the BCJR and MLSE methods are compounded when the post-compensation equalizer is implemented inside of a decoding loop, such as the FEC decoding loop 103 illustrated in FIG. 1. In these implementations, the computational complexity and delay caused by the post-compensation equalizer can significantly limit the number of global decoding iterations, as well as the number of internal FEC decoding iterations.

Aspects of the present disclosure relate to post-compensation methods and post-compensators that can perform noise-whitening and post-compensation equalization with comparable BER performance to the optimal method using fewer resources. According to some of these aspects, the computational complexity and delay of the post-compensation methods increases linearly with symbol constellation size and whitening filter length. In addition, the post-compensation methods may be implemented in combination when better equalizer performance is required, or separately when a low computational complexity is required.

In some embodiments of the present disclosure, decision feedback equalization (DFE) is used as a method for post-compensation equalization. DFE is a non-linear equalization method that may exhibit improved BER performance compared to linear equalizers. DFE may be especially useful with severely distorted channels, for example, when the roots of the Z-transform of the channel impulse response are close to the unit circle. The computational complexity of the DFE method is also relatively low compared to the BCJR and MLSE methods. For example, the computational complexity of the DFE method increases linearly with symbol constellation size and whitening filter length.

Figure 3:
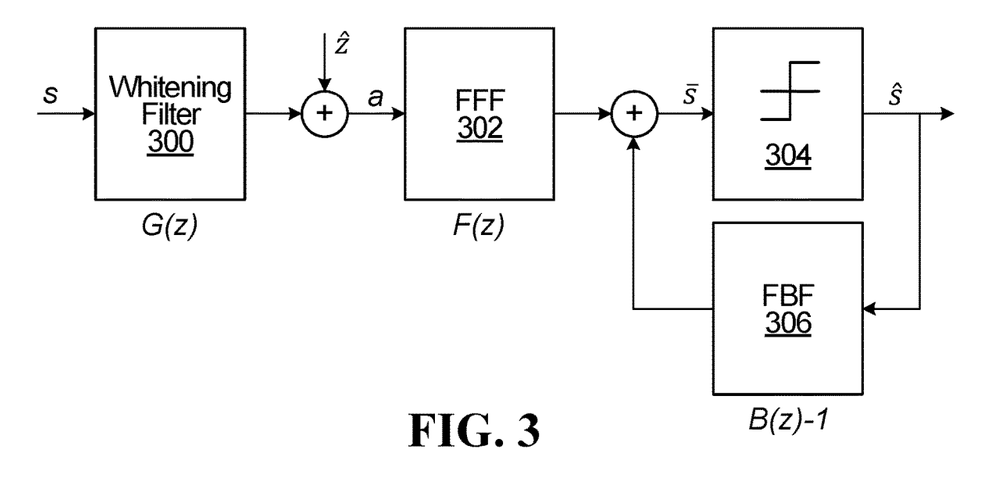
FIG. 3 is a block diagram illustrating an example of a post-compensator using a decision feedback equalization (DFE) method.

Referring to FIG. 3, shown is a block diagram illustrating an example of a post-compensator using a DFE method. FIG. 3 includes transmitted symbols s, whitening filter 300, white additive noise $\hat{z}$, filtered signal a, feed-forward filter (FFF) 302, estimated symbols $\bar{s}$ and decided symbols $\hat{s}$, decision device 304 and feed-backward filter (FBF) 306. The transfer functions of the whitening filter 300, the FFF 302 and FBF 306 are denoted as G(z), F(z), and B(z)−1, respectively. Here, z denotes a complex frequency-domain variable. Similar to the post-compensator of FIG. 2, the post-compensator of FIG. 3 may be part of an equalizer. In some embodiments, the post-compensation block 102 of FIG. 1 includes the post-compensator illustrated in FIG. 3.

In FIG. 3, the transmitted symbols s are input to the whitening filter 300. The output of the whitening filter 300 is combined with the white additive noise $\hat{z}$ to form the filtered signal a. The filtered signal a is then input into the FFF 302. The output of the FFF 302 is combined with the output of the FBF 306 to form the estimated symbols $\bar{s}$. The estimated symbols $\bar{s}$ are input into the decision device 304, which performs a soft or hard decision on the estimated symbols $\bar{s}$ and outputs the decided symbols $\hat{s}$. The decided symbols $\hat{s}$ are then input into the FBF 306.

The transmitted symbols s may be received from a linear equalizer, such as linear equalizer 100, and are input into the whitening filter 300. Although not shown in FIG. 3, the whitening filter 300 reduces the noise coloring associated with the transmitted symbols s, producing white additive noise $\hat{z}$. As discussed above, the whitening filter 300 may also result in correlation of the transmitted symbols s. The filtered signal a is a combination of these correlated symbols and the white additive noise $\hat{z}$. It should be noted that although the transmitted symbols s and the white additive noise $\hat{z}$ are shown as separate inputs in FIG. 3, in practical applications the transmitted symbols and white additive noise would be received as one signal.

Similar to equation (2) discussed above, the filtered signal a illustrated in FIG. 3 may be expressed as:

$$a_p[n]=\sum_{m=1}^{M} g[m] s_p[n-m]+\hat{z}[n]=Gs_p+\hat{z}. \quad (3)$$

The DFE method processes the filtered signal a and provides the decided symbols $\hat{s}$. The DFE method includes two main filters: FFF 302 and FBF 306. Both filters may be optimized based on the minimum mean squared error (MMSE) criterion. The FFF 302 processes filtered signal a, and the FBF 306 forms a weighted linear combination of the previous symbol decisions by decision device 304. The FBF 306 then cancels the ISI caused by the previous symbols from the output of the FFF 302 to produce the estimated symbols $\bar{s}$. The estimated symbols $\bar{s}$ may be expressed as:

$$\bar{s}[n]=\sum_{k=1}^{L_F} f[k]a[n-k]-\sum_{k=1}^{L_B} b[k]\hat{s}[n-k]. \quad (4)$$

Here, f[k] and b[k] are the time-domain representations of $F(z)=\Sigma_k\, f[k]z^{-k}$, and $B(z)=\sigma_k\, b[k]z^{-k}$, respectively. $L_F$ and $L_B$ denote the number of taps for the FFF and FBF, respectively. Solving equation (4) for f and b, the following equations are produced:

$$f=((\Phi_{gg}-D\, D^H)+\sigma^2 I)^{-1}\, g;\ \text{and} \quad (5)$$

$$b=D^H f. \quad (6)$$

Here, D is the convolution matrix of the filter g, $\Phi_{gg}$ is the autocorrelation matrix of the filter taps g, $\sigma^2$ is the noise variance per real dimension and 1 is the identity matrix. In some implementations of FIG. 3, the variables f and b are fixed after equations (5) and (6) are solved. However, in other implementations, the filter taps g are updated periodically, and therefore the variables f and b may be updated accordingly.

A problem associated with the implementation of the DFE method is the inverse matrix computation required in equation (5). However, this computation may be simplified by noting that the matrix, $\Lambda=(\Phi_{gg}-D\, D^H)+\sigma^2 I$, is a positive definite matrix. Therefore, $\Lambda$ may be factorized into $\Lambda=L*L'$, using Cholesky decomposition, where L is a lower triangular matrix. Therefore, $\Lambda^{-1}=(L*L')^{-1}=L^{-1}L'^{-1}$. Since L is a lower triangular matrix, the computation of the inverse of L can be implemented efficiently using row transformation operations.

The decision device may be implemented in whole or in part in hardware, firmware, one or more components that execute software, or some combination thereof. According to some embodiments of FIG. 3, the decision device 304 is a hard decision device, such as a hard decision slicer, which makes one decision regarding each of the estimated symbols $\bar{s}$. In these embodiments, decided symbols $\hat{s}$ are hard decision symbols. The DFE method then operates under the assumption that the previous decisions are correct.

According to other embodiments, the decision device 304 is a soft decision device. A soft decision device requires knowledge of the noise variance in a signal and provides a better estimate of the decided symbols. A soft decision device may reduce the effect of error propagation in DFE compared to a hard decision device. In these embodiments, decided symbols $\hat{s}$ are soft decision symbols. The soft decision device generates the soft decision symbols $\hat{s}$ based on two steps. In the first step, the soft decision device computes the log likelihood ratio (LLR) $\lambda_b$ of the bits constituting the estimated symbols $\bar{s}$. This is also known as soft-demapping. In the second step, the soft decision device uses the computed LLRs to generate the soft decided symbols $\hat{s}$. By way of example, for a symbol with a QPSK constellation and separate processing per dimension of the constellation, these two steps may be performed as follows:

$$\lambda_b = \frac{2\bar{s}}{\sigma^2};\ \text{and} \quad (7)$$

$$\hat{s} = \tanh(0.5\lambda_b) = \tanh\left(\frac{\bar{s}}{\sigma^2}\right). \quad (8)$$

In some embodiments, the implementation of the tanh function is performed using a look-up table consisting of relatively few elements by exploiting the following properties of the tanh function:

a) The tanh function has odd symmetry, thus tanh(−x)= tanh(x); and b) The tanh function approaches 1 as x approaches infinity, thus tanh(x)≈1, for x≥3.

When larger constellations are used, such as higher order QAM constellations, the computation of LLRs may become more computationally complex. However, some aspects of the present disclosure use simplified formulas for the computation of LLRs to reduce complexity, as described below.

Figure 4:
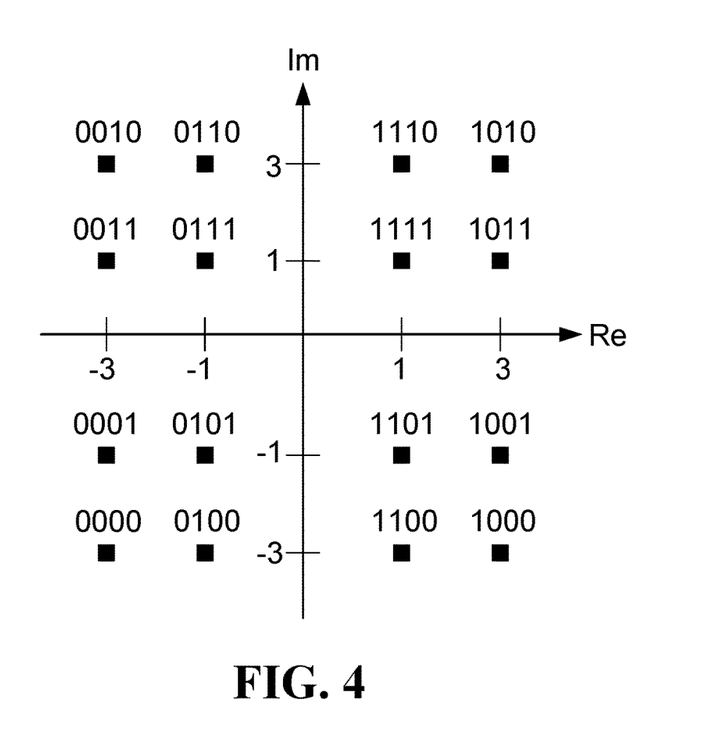
FIG. 4 is a plot illustrating an example of a 16 QAM constellation.

FIG. 4 is a plot illustrating an example of a 16 QAM constellation. FIG. 4 includes a real dimension on the x-axis, and an imaginary dimension on the y-axis. The locations of 16 symbols in the constellation are also illustrated.

For each dimension of the 16 QAM constellation illustrated in FIG. 4, the LLRs may calculated by:

$$\lambda_{b1} = \begin{cases} \bar{s}_d, & |\bar{s}_d| \le 2 \\ 2(\bar{s}_d - 1), & \bar{s}_d > 2 \\ 2(\bar{s}_d + 1), & \bar{s}_d < -2 \end{cases}\ ;\text{and} \quad (9)$$

$$\lambda_{b2} = \frac{4(-|\bar{s}_d| + 2)}{\sigma^2}. \quad (10)$$

Here, d denotes the real or imaginary component of estimated symbols $\bar{s}$. Using equations (9) and (10), the soft symbol estimate may be calculated by:

$$P = \frac{1}{1+\exp\left(\frac{4\lambda_{b1}}{\sigma^2}\right)} = 1 - 0.5\left(1+\tanh\left(\frac{2\lambda_{b1}}{\sigma^2}\right)\right); \quad (11)$$

$$Q = \tanh\left(\frac{\lambda_{b2}}{2}\right);\ \text{and} \quad (12)$$

$$\hat{s}_d = (2P-1)Q. \quad (13)$$

Although equations (9) to (13) do not represent an exact computation of LLRs, these equations may be less computationally complex than the exact calculation. The approximation of the tanh function described above may also be implemented in equations (11) and (12) to improve the speed and efficiency of the soft symbol decision device.

In further embodiments of the present disclosure, linear predictive coding (LPC) is used as a method for post-compensation equalization. LPC is the process of predicting the value of a sample based on a linear combination of past samples. The noise associated with the symbols received from a linear equalizer is correlated, and exploiting this noise correlation may lead to additional improvements in the operation of a post-compensation equalizer. In other words, the LPC method may be implemented to predict noise sample associated with a current received symbol based on the noise samples associated with past symbols.

Mathematically, predicted noise samples $\tilde{z}$ that are provided using the LPC method may be expressed as:

$$\tilde{z}[n]=-q_1\bar{z}[n-1]-q_2\bar{z}[n-2]\ldots -q_M\bar{z}[n-M]+e[n]. \quad (14)$$

Here, $q=q_1, q_2 \ldots q_M$ represents a prediction filter, and e represents a prediction error. In some embodiments, the prediction filter that minimizes the mean square error (MSE) corresponds to the filter taps g discussed above, with the first tap set to zero, i.e., g(1)=0. In these embodiments, equation (14) may be expressed as:

$$\tilde{z}[n]=-q_1\bar{z}[n-1]-q_2\bar{z}[n-2]\ldots -q_M\bar{z}[n-M]+e[n]. \quad (15)$$

The computational complexity associated with the implementation of the LPC method may be relatively low. For example, the LPC method is independent of constellation size and is linearly dependent on the length of the prediction filter. In some implementations, the length of the prediction filter may be 3~5. One disadvantage of the LPC method is that it adds prediction error to the predicted noise samples. However, in some implementations of the LPC method the noise reduction due to subtracting the predicted noise samples is greater than the added prediction error, and therefore the LPC method is beneficial.

Figure 5:
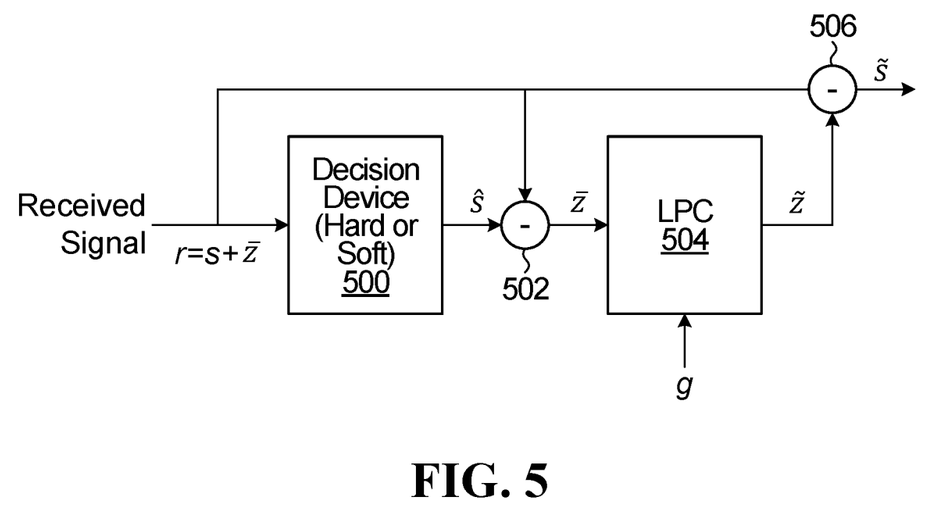
FIG. 5 is a block diagram illustrating an example of a post-compensator using a linear predictive coding (LPC) method.

Referring to FIG. 5, shown is a block diagram illustrating an example of a post-compensator using an LPC method. FIG. 5 includes received signal r, decision device 500, decided symbols ŝ, subtractor 502, colored additive noise z̄, filter taps g, LPC block 504, predicted noise samples z̃, subtractor 506 and estimated symbols s̃. The received signal r is input into the decision device 500, the subtractor 502 and the subtractor 506. The decided symbols ŝ are output from the decision device 500 and also input into the subtractor 502. The colored additive noise z̄ is input into the LPC block 504. The filter taps g are also input into the LPC block 504. The predicted noise samples z̃ are output from the LPC block 504 and input into the subtractor 506. The estimated symbols s̃ are output from the subtractor 506.

In FIG. 5, the received signal r is de-mapped using soft decisions or hard decisions. Therefore, the decision device 500 may be a soft decision device or a hard decision device. Similarly, the decided symbols ŝ may be soft decision symbols or hard decision symbols. In some embodiments, the decision device 500 is similar to the decision device 304.

The decided symbols ŝ are subtracted from the received signal by subtractor 502 to give an estimate of the noise associated with the received symbols r. The estimate of the noise associated with the received symbols r is the colored additive noise z̄. The colored additive noise z̄ is further processed using LPC to generate the predicted noise samples z̃. The LPC block 504 performs the LPC method on the colored additive noise z̄. The LPC block 504 may use equation 14 or equation 15 defined above to implement the LPC method. Predicted noise samples z̃ are subtracted from the received signal r using the subtractor 506 to produce the estimated symbols s̃. The subtractors 502 and 506 may be implemented in whole or in part in hardware, firmware, one or more components that execute software, or some combination thereof.

In some embodiments of the present disclosure, a combination of the DFE and LPE methods are used for post-compensation equalization. For example, the DFE method followed by the LPC method may be used for post-compensation equalization.

Figure 6:
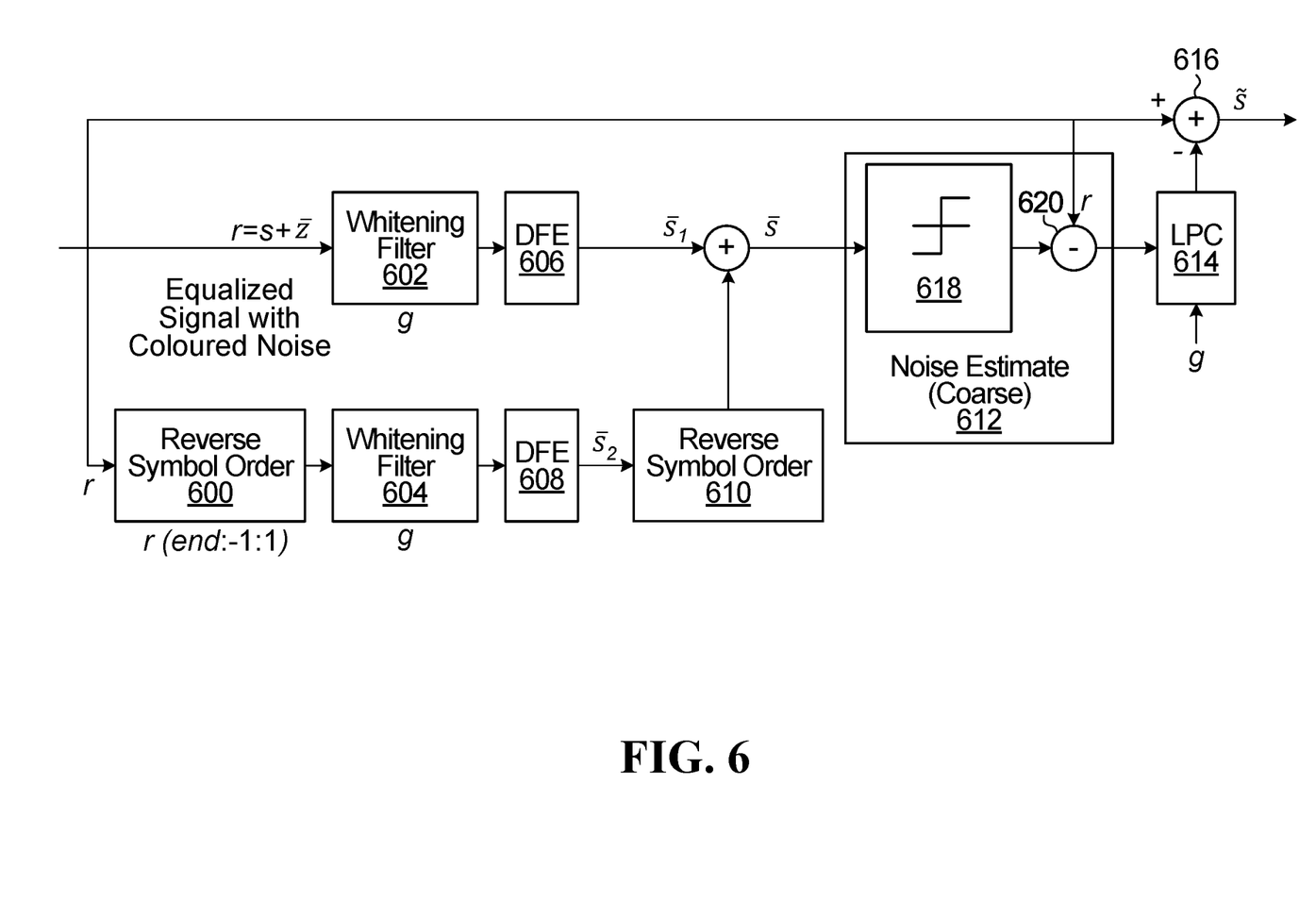
FIG. 6 is a block diagram illustrating an example of a post-compensator using a bi-direction DFE method followed by an LPC method.

Referring to FIG. 6, shown is a block diagram illustrating an example of a post-compensator using a bi-direction DFE method followed by an LPC method. FIG. 6 includes a received signal r, reverse symbol order blocks 600 and 610, whitening filters 602 and 604, DFE blocks 606 and 608, estimated symbols s̄, s̄$_1$, s̄$_2$ and s̃, noise estimate block 612, filter taps g and LPC block 614. The post-compensator of FIG. 6 may be part of an equalizer. In some embodiments, the post-compensation block 102 of FIG. 1 includes the post-compensator illustrated in FIG. 6.

The received signal r is sent to the whitening filter 602, which sends its output to the DFE block 606, producing the estimated symbols s̄$_1$. The received signal r is also sent to the reverse symbol order block 600, which sends its output to the whitening filter 604 followed by the DFE block 608, producing the estimated symbols s̄$_2$. The output of the DFE block 608 is then sent to the reverse symbol order block 610. The outputs of the DFE block 606 and the reverse symbol order block 610 are combined to form the estimated symbols s̄. The noise estimate block 612 computes noise estimates associated with the received signal r, which is sent to the LPC block 614. The LPC block 614 then computes predicted noise associated with the received signal r, using the filter taps g as an input. The predicted noise associated with received signal r is then subtracted from the received signal r by subtractor 616 to produce the estimated symbols s̃.

The received signal r is an equalized signal with colored noise, and is a combination of the transmitted symbols s and the colored additive noise z̄. In some embodiments, the equalized signal r is an output of a linear equalizer, such as the linear equalizer 100.

The combination of the whitening filter 602 and the DFE block 606 operates in a similar manner to the post-compensator illustrated in FIG. 3. The combination of the whitening filter 604 and the DFE block 608 also operates in a similar manner to the post-compensator illustrated in FIG. 3. However, the order of the transmitted symbols s in the received signal r has been reversed using the reverse symbol order block 600. The reverse symbol order block 600 flips the sequence of symbols in the received signal r such that the first symbol becomes the last symbol. For example, reverse symbol order operation may be expressed as, r(end: −1: 1). After the estimated symbols z̄$_2$ are produced, the order is reversed again using the reverse symbol order block 610 to match the symbol order in the estimated symbols s̄$_1$. This concept of flipping the sequence order of a received signal is known as backward DFE, which may lead to different symbol estimates when compared with forward DFE.

In FIG. 6, it is assumed that the filter g is a real-valued whitening filter. However, this may not be the case in all implementations of the bi-directional DFE method. In the case that g is a complex-valued whitening filter for the forward direction, in the reverse direction the whitening filter would be the conjugate of g.

The estimated symbols s̄$_1$ and s̄$_2$ are averaged to form the estimated symbols s̄. These estimated symbols s may have closer Euclidean distances to the transmitted symbols s when compared to the received signal r. This method of using forward DFE and backward DFE together is known as bi-directional DFE, which may lead to ~0.6 dB gain in SNR compared with forward DFE alone. However, it should be appreciated that post-compensation using a DFE method followed by an LPC method may be performed without bi-directional DFE. According to some embodiments, only one of forward DFE and backward DFE is used in combination with the LPC method.

Following the generation of the estimated symbols s̄, a noise estimate associated with the received signal r is calculated by the noise estimate block 612. In the illustrated example, the noise estimate block 612 includes a decision device 618 and a subtractor 620. In some implementations, the noise estimate block 612 performs the calculation using the equation, noise=r−f̃(s̄), where f̃(s̄) represents the decision device 618. The decision device 618 may be a hard or soft decision device. The decision device 618 produces decisions for the estimated symbols s̄. In some embodiments, the decision device 618 may operate in a manner similar to the decision device 304. The calculation of noise is preformed by the subtractor 620. The noise estimates are then sent to LPC block 614. The noise estimate produced by noise estimate block 612 may be considered a coarse noise estimate.

The LPC block 614 performs the LPC method on the noise estimates. The LPC block 614 may operate in a similar manner to the LPC block 504 illustrated in FIG. 5. In FIG. 6, the prediction filter used by the LPC block 614 is based on the filter taps g, which are also used by the whitening filters 602 and 604. The LPC block 614 may perform the calculation shown in equation (15), where the noise calculated in the noise estimate block 612 is used as the values of $\bar{z}$ in equation (15). Since the noise associated with the received signal r is correlated, the LPC method may be used to predict the value of a current noise sample based on past noise samples. The LPC block 614 therefore produces a predicted noise associated with the received signal r. The combination of noise estimation block 612 and LPC block 614 may be considered a noise predictor. The predicted noise associated with the received signal r is then subtracted from the received signal r by subtractor 616 to form the estimated symbols $\tilde{s}$.

The post-compensator of FIG. 6 may exhibit improved BER performance compared with the DFE and LPC methods implemented separately. For example, using the LPC method in combination with the DFE method may result in ~0.1-0.2 dB gain in SNR compared to the DFE method alone. In some implementations, the post-compensator of FIG. 6 exhibits comparable BER performance to the BCJR method while using fewer resources.

In some embodiments of the present disclosure, the post-compensators illustrated in FIGS. 3, 5 and 6 are implemented, at least in part, inside of a turbo-equalization loop, such as the turbo-equalization loop 103 illustrated in FIG. 1. For example, a post-compensation equalizer may exchange a-priori information with an FEC decoder in order to improve detection and/or decoding performance. During each iteration of the turbo-equalization loop, the post-compensation equalizer equalizes a filtered signal. The post-compensation equalizer then outputs LLR values, which are scaled and sent to an FEC decoder as a-priori information for use during decoding. The output of the FEC decoder also includes LLR values, and is scaled and sent back to the post-compensation equalizer as a-priori information for use during post-compensation equalization in the following iteration.

In a turbo-equalization loop, the computational complexity and delay associated with the post-compensation equalizers may form a bottle-neck issue from an implementation point of view. According to some embodiments of the present disclosure, a low complexity implementation of a post-compensation equalizer that is suitable for turbo-equalization loops is provided, which produces a BER performance comparable to the BCJR and MLSE methods.

Figure 7:
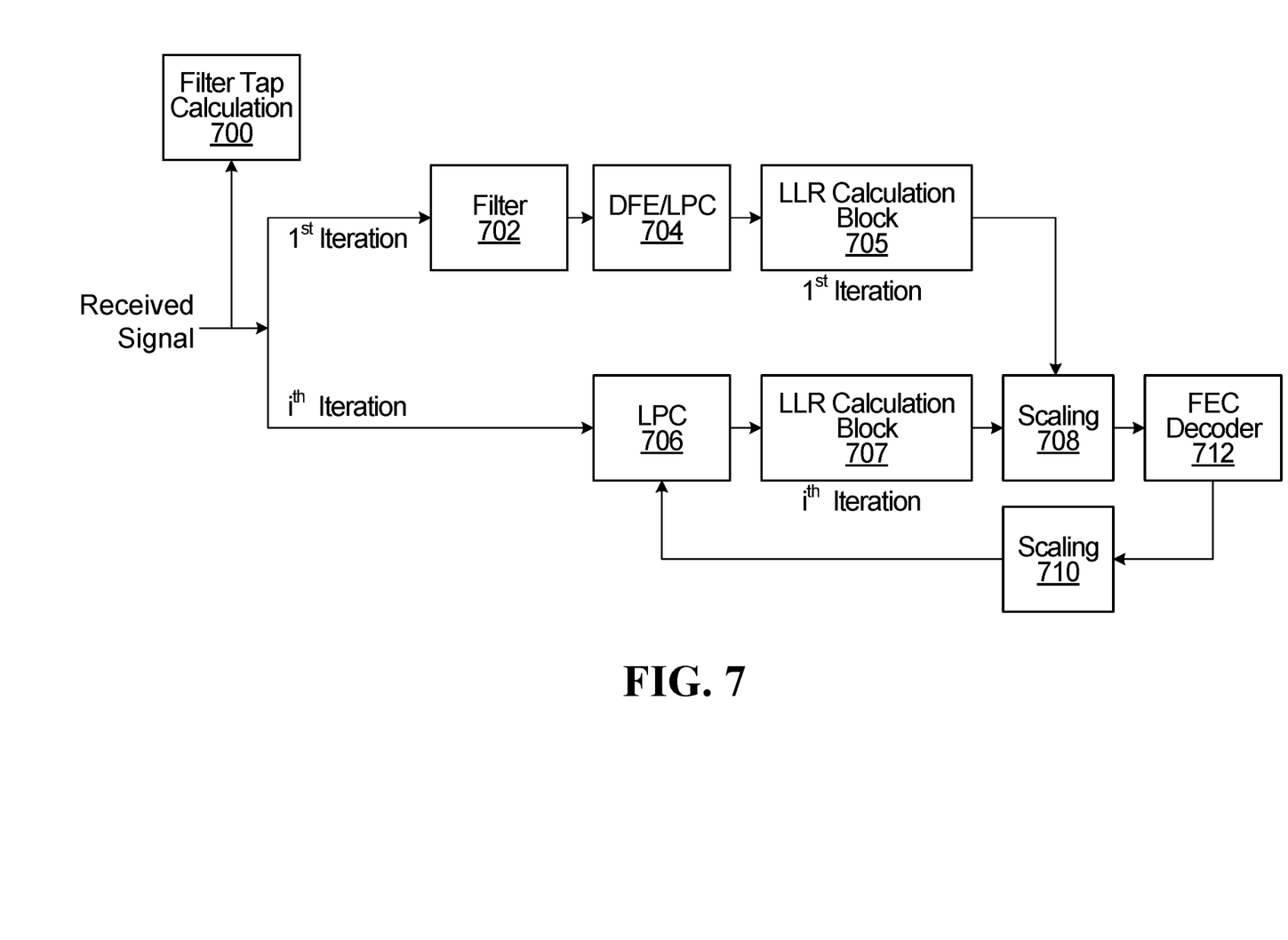
FIG. 7 is a block diagram illustrating an example of a post-compensator with a turbo-equalization loop.

Referring to FIG. 7, shown is a block diagram illustrating an example of a post-compensator with a turbo-equalization loop. FIG. 7 includes a received signal, a filter tap calculation block 700, a filter 702, a DFE/LPC block 704, LLR calculation blocks 705 and 707, an LPC block 706, scaling blocks 708 and 710, and an FEC decoder 712.

In FIG. 7, the received signal is sent to filter tap calculation block 700. The received signal is also sent to the filter 702 and the LPC equalization block 706. The output of the LPC equalization block 706 is sent to the LLR calculation block 707. The output of the filter 702 is sent to the DFE/LPC block 704. The output of the DFE/LPC block 704 is sent to the LLR calculation block 705. The outputs of both the LLR calculation block 707 and the LLR calculation block 705 are sent to the scaling block 708. The output of the scaling block 708 is sent to the FEC decoder 712. The output of the FEC decoder 712 is sent to the scaling block 710, and the output of scaling block 710 is sent to the LPC block 706.

The received signal in FIG. 7 includes a series of transmitted symbols, as well as colored noise. The received signal may include one polarization or multiple polarizations. The received signal may be received from a linear equalizer, such as linear equalizer 100 illustrated in FIG. 1.

The filter tap calculation block 700 of FIG. 7 is similar to the filter tap calculation block 200 of FIG. 2. The filter tap calculation block 700 calculates filter taps for use in filter 702. In some implementations, the filter taps are also used in the LPC prediction filter of the DFE/LPC block 704 and the LPC block 706. The filter taps may be calculated once, or they may be calculated periodically.

After the filter taps are calculated, the post-compensator of FIG. 7 carries out multiple iterations of a turbo-equalization loop for each symbol in the received signal. In the first iteration of the turbo-equalization loop for a specific symbol, filtering using the filter 702 is performed to reduce the colored noise associated with the specific symbol. This filter is similar to the filter 202 illustrated in FIG. 2. In some implementations, the filter 702 is a whitening filter.

Following the filter 702 in the first iteration, post-compensation equalization is performed in the DFE/LPC block 704, which may use the DFE method, the LPC method, or a combination of the DFE method and the LPC method. In some implementations, post-compensation equalization is performed in the DFE/LPC block 704 using a method similar to the method illustrated in FIG. 6. In other implementations, the DFE/LPC block 704 does not use the LPC method at all. In these implementations, post-compensation equalization may be performed in the DFE/LPC block 704 using the post-compensation equalization method illustrated in FIG. 3. In further implementations, the DFE/LPC block 704 does not use the DFE method. In these implementations, post-compensation equalization may be performed in the DFE/LPC block 704 using the post-compensation equalization method illustrated in FIG. 5.

The DFE/LPC block 704 produces an estimate of the specific symbol that is then sent to the LLR calculation block 705. The calculation block 705 then computes an LLR value (or LLR values) for the estimate of the specific symbol. This LLR value is then sent to the scaling block 708, which multiplies the LLR value by a scaling factor. Following the scaling block 708, the LLR value is then sent to the FEC decoder 712, which recovers the transmitted codeword. The scaling block 708 may be implemented, for example, if the FEC decoder 712 has a limited fixed point precision. It should be noted that the LPC block 706 is bypassed in the first iteration of the turbo-equalization loop.

In the second iteration of the turbo-equalization loop of FIG. 7, output or extrinsic information from the FEC decoder 712 is scaled by the scaling block 710 and sent to the LPC block 706. The LPC block 706 uses the scaled output or extrinsic information of the FEC decoder 712 as a-priori information to generate soft estimates of the transmitted symbols and uses these estimates to calculate an estimate of the noise by subtracting them from the received signal. Then a predicted noise associated with the received signal is computed by the LPC method. The predicted noise is subtracted from the received signal, which is followed by soft-demapping. LLR calculation block 707 performs the soft-demapping to produce an updated LLR value for the second iteration of the turbo-equalization loop. The updated LLR value is scaled and fed to the FEC decoder 712. In some implementations, post-compensation equalization is performed in the LPC block 706 using a method similar to the method illustrated in FIG. 5.

The updated LLRs of the soft symbol estimates that are sent to the FEC decoder 712 in the second iteration may be more accurate than the LLRs of the soft symbol estimate sent to the FEC decoder 712 in the first iteration. The post-equalization method of FIG. 7 may end after the second iteration. Alternatively, any number of additional iterations may also be performed to further improve the soft symbol estimates using the LPC block 706. For example, a total of 3 or 4 iterations may be performed. It should be noted that the filter 702 and the DFE/LPC block 704 are bypassed in all iterations of the turbo-equalization loop after the first iteration. After all of the iterations of the turbo-equalization loop have been performed, the final LLRs at the output of the FEC decoder 712 may be used to regenerate the symbols in the received signal.

Although the LLR calculation blocks 705 and 707 are described as producing LLR values, in general, the LLR calculation blocks 705 and 707 may produce any appropriate reliability measure for the estimated symbols.

Figure 8:
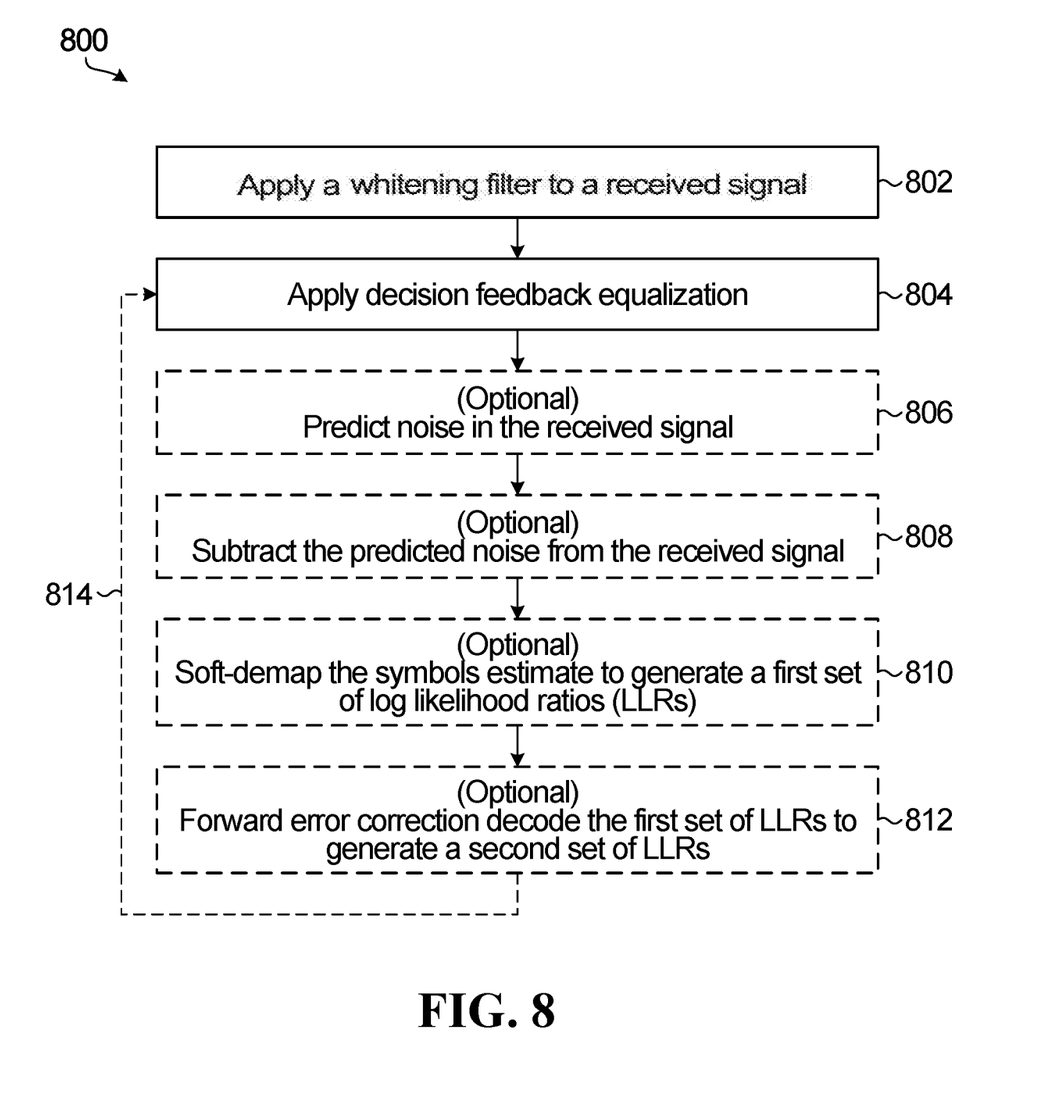
FIG. 8 is a flow diagram of example operations in an apparatus according to example embodiments described herein.

FIG. 8 is a flow diagram of example operations 800 for noise whitening post-compensation according to example embodiments described herein. In block 802, a whitening filter is applied to a received signal comprising symbols to generate a first filtered signal. In block 804, DFE is then applied to the first filtered signal to generate estimates for the symbols of the received signal. Optionally, in block 806, noise in the received signal is predicted. Optionally, in block 808, the predicted noise is then subtracted from the received signal to generate a symbols estimate. Optionally, in block 810, soft-demapping is performed on the symbols estimate to generate a first set of LLRs for the symbols estimate. Optionally, in block 812, FEC decoding is applied to the first set of LLRs to generate a second set of LLRs. Optionally, as indicated at 814, example operations 800 may return to block 804 from block 814 as a part of performing one or more iterations of a decoding loop that sends the second set of LLRs as a-priori information for a subsequent iteration of the DFE applied to the first filtered signal.

The example operations 800 are illustrative of an example embodiment. Various ways to perform the illustrated operations, as well as examples of other operations that may be performed, are described herein. Further variations may be or become apparent.

For example, in some embodiments, applying DFE in block 804 may include feed-forward filtering the first filtered signal to generate a second filtered signal; combining the second filtered signal and a third filtered signal to generate a first symbols estimate; generating a second symbols estimate or decision based on the first symbols estimate; and feed-back filtering the second symbols estimate or decision to generate the third filtered signal. In further embodiments, generating the second symbols estimate or decision based on the first symbols estimate includes generating a soft symbols decision based on the first symbols estimate. In some embodiments, generating the soft symbols decision based on the first symbols estimate includes generating at least one log likelihood ratio.

In some embodiments, the example operations 800 also include reversing an order of the symbols of the received signal to generate a reversed signal; applying a whitening filter to the reversed signal to generate a filtered reversed signal; applying DFE to the filtered reversed signal to generate a reversed symbols estimate for the symbols of the reversed signal; reversing an order of the symbols of the reversed symbols estimate to generate a third symbols estimate; combining the second symbols estimate and the third symbols estimate to generate a fourth symbols estimate; and generating a symbols decision based on the fourth symbols estimate In some embodiments, block 806 includes subtracting the symbols decision from the received signal to generate noise estimates; and applying LPC to the noise estimates to generate the predicted noise. In further embodiments, applying LPC includes calculating:

$$\tilde{z}[n] = -q_1\bar{z}[n-1] - q_2\bar{z}[n-2] \ldots -q_M\bar{z}[n-M] + e[n],$$

where $\tilde{z}$ denotes the predicted noise, $\bar{z}$ denotes the noise estimates, n denotes a symbol index for the symbols of the received signal, $q=q_1, q_2 \ldots q_M$ denotes a prediction filter, and e denotes a prediction error. In other embodiments, applying a whitening filter to the received signal comprises generating filter taps, and applying LPC to the noise estimates comprises generating the prediction filter based on the filter taps.

In some embodiments, the example operations 800 also include regenerating the symbols of the received symbol using the second set of LLRs.

In some embodiments, the decoding loop indicated at 814 includes one or more iterations of a decoding loop that sends the second set of LLRs as a-priori information for a subsequent iteration of equalization different from the DFE applied to the first filtered signal.

Figure 9:
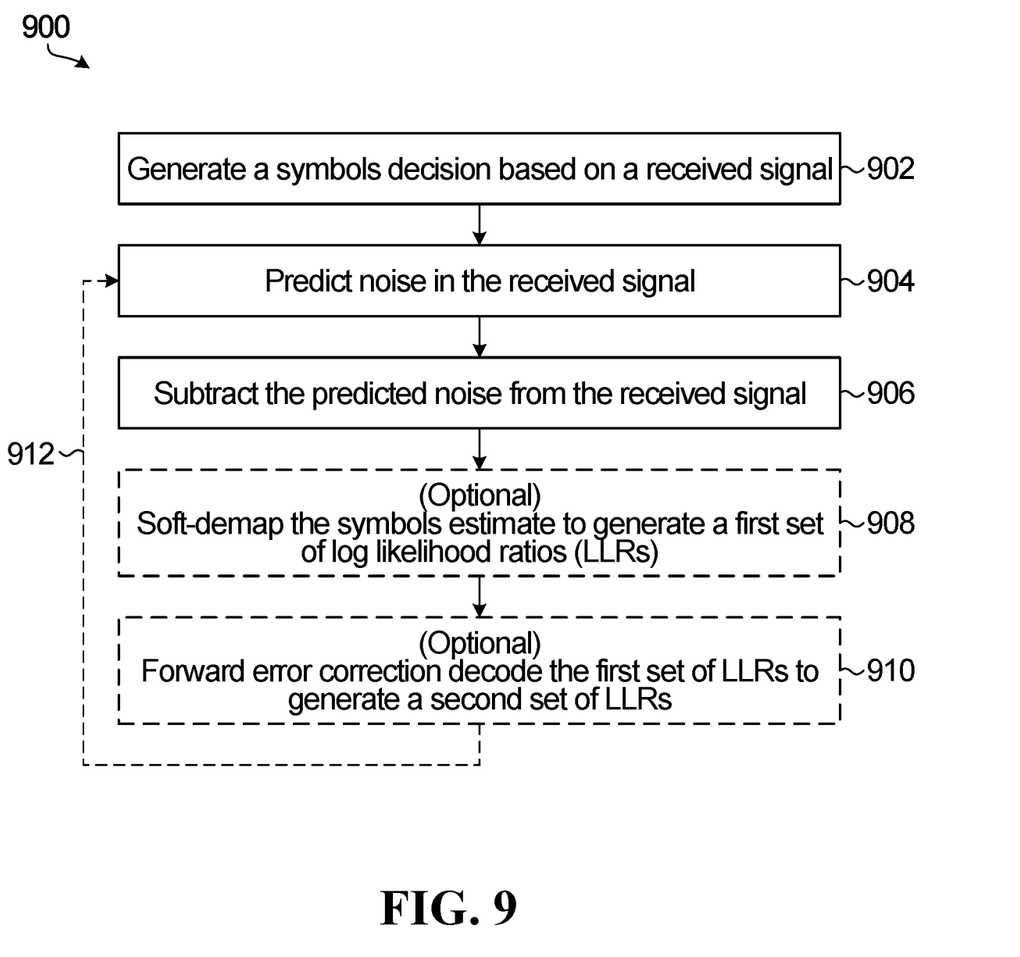
FIG. 9 is another flow diagram of example operations in an apparatus according to example embodiments described herein.

FIG. 9 is a flow diagram of example operations 900 for noise whitening post-compensation according to example embodiments described herein. In block 902, a symbols decision is generated based on a received signal. In block 904, noise in the received signal is predicted based on the symbols decision. In block 906, the predicted noise is then subtracted from the received signal to generate a symbols estimate. Optionally, in block 908, soft-demapping is performed on the symbols estimate to generate a first set of LLRs for a symbols estimate. Optionally, in block 910, FEC decoding is applied to the first set of LLRs to generate a second set of LLRs. Optionally, as indicated at 912, example operations 900 may return to block 904 from block 910 as a part of performing one or more iterations of a decoding loop that sends the second set of LLRs as a-priori information for a subsequent iteration of predicting noise in the received signal.

The example operations 900 are illustrative of an example embodiment. Various ways to perform the illustrated operations, as well as examples of other operations that may be performed, are described herein. Further variations may be or become apparent.

For example, in some embodiments, the block 902 includes generating a soft symbol decision based on the received symbol. In other embodiments, the block 902 includes generating a hard symbol decision based on the received symbol.

In some embodiments, block 904 includes subtracting the symbols decision from the received signal to generate noise estimates and applying LPC to the noise estimates to generate the predicted noise. In further embodiments, applying LPC includes calculating:

$$\tilde{z}[n] = -q_1\bar{z}[n-1] - q_2\bar{z}[n-2] \ldots -q_M\bar{z}[n-M] + e[n],$$

where $\tilde{z}$ denotes the predicted noise, $\bar{z}$ denotes the noise estimates, n denotes a symbol index for the symbols of the received signal, $q=q_1, q_2 \ldots q_M$ denotes a prediction filter, and e denotes a prediction error. In other embodiments, applying a whitening filter to the received signal comprises generating filter taps, and applying LPC to the noise estimates comprises generating the prediction filter based on the filter taps.

In some embodiments, the example operations 900 also include regenerating the symbols of the received symbol using the second set of LLRs.

In some embodiments, the decoding loop indicated at 912 includes one or more iterations of a decoding loop that sends the second set of LLRs as a-priori information for a subsequent iteration of equalization different from LPC.

What has been described is merely illustrative of the application of the principles of the disclosure. Other arrangements and methods can be implemented by those skilled in the art without departing from the spirit and scope of the present disclosure.

Hardware implementations of any block, module, component, or device exemplified herein may include electrical or optical circuitry, such as integrated circuits, printed circuit boards, discrete circuits, analog circuits, digital circuits and any combination thereof.

Moreover, any block, module, component, or device exemplified herein may include software or firmware that executes instructions, and may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

The invention claimed is:

1. An apparatus for noise-whitening post-compensation, the apparatus comprising:
   a first whitening filter configured to filter a received signal comprising symbols to generate a first filtered signal;
   a first decision feedback equalizer having an input coupled to an output of the first whitening filter to receive the first filtered signal, the first decision feedback equalizer configured to apply decision feedback equalization (DFE) to the first filtered signal to generate a first symbols estimate for the symbols of the received signal;
   a first reverser configured to reverse an order of the symbols of the received signal to generate a reversed signal;
   a second whitening filter having an input coupled to an output of the first reverser to receive the reversed signal, the second whitening filter configured to filter the reversed signal to generate a filtered reversed signal;
   a second decision feedback equalizer having an input coupled to an output of the second whitening filter to receive the filtered reversed signal, the second decision feedback equalizer configured to apply DFE to the filtered reversed signal to generate a reversed symbols estimate for the symbols of the reversed signal;
   a second reverser having an input coupled to an output of the second decision feedback equalizer to receive the reversed symbols estimate, the second reverser configured to reverse an order of the symbols of the reversed symbols estimate to generate a second symbols estimate;
   a first combiner having a first input coupled to an output of the first decision feedback equalizer to receive the first symbols estimate and having a second input coupled to an output of the second reverser to receive the second symbols estimate, the first combiner configured to combine the first symbols estimate and the second symbols estimate to generate a third symbols estimate;
   a noise predictor having an input coupled to an output of the first combiner to receive the third symbols estimate, the noise predictor configured to predict noise in the received signal; and
   a first subtractor having an input coupled to an output of the noise predictor to receive the predicted noise, the first subtractor configured to subtract the predicted noise from the received signal to generate a fourth symbols estimate, wherein the noise predictor comprises:
   a decision device having an input coupled to the output of the first combiner, the decision device configured to generate a symbols decision based on the third symbols estimate;
   a second subtractor having an input coupled to an output of the decision device to receive the symbols decision, the second subtractor configured to subtract the symbols decision from the received signal to generate noise estimates; and
   a linear predictive coder having an input coupled to an output of the second subtractor to receive the noise estimates, the linear predictive coder configured to apply linear predictive coding (LPC) to the noise estimates to generate the predicted noise.

2. The apparatus of claim 1, wherein the linear predictive coder is further configured to calculate:

$$\tilde{z}[n] = -q_1 \bar{z}[n-1] - q_2 \bar{z}[n-2] \ldots -q_M \bar{z}[n-M] + e[n],$$

wherein $\tilde{z}$ denotes the predicted noise, $\bar{z}$ denotes the noise estimates, n denotes a symbol index for the symbols of the received signal, $q = q_1, q_2, \ldots q_M$ denotes a prediction filter, and e denotes a prediction error.

3. The apparatus of claim 2, wherein the first whitening filter and the prediction filter are based on same filter taps.

4. The apparatus of claim 1, further comprising:
   a soft-demapper having an input coupled to an output of the first subtractor to receive the fourth symbols estimate, the soft-demapper configured to soft-demap the fourth symbols estimate to generate a first set of log likelihood ratios (LLRs) for the fourth symbols estimate.

5. The apparatus of claim 4, further comprising:
   a forward error correction (FEC) decoder having an input coupled to an output of the soft-demapper to receive the first set of LLRs, the FEC decoder configured to FEC decode the first set of LLRs to generate a second set of LLRs.

6. The apparatus of claim 5, further comprising:
   a regenerator having an input coupled to an output of the FEC decoder to receive the second set of LLRs, the regenerator configured to regenerate the symbols of the received signal using the second set of LLRs.

7. The apparatus of claim 5, further comprising:
a decoding loop having an input coupled to the output of the FEC decoder to receive the second set of LLRs, the decoding loop being configured to perform one or more iterations of decoding.

8. The apparatus of claim 7, wherein the decoding loop comprises an output coupled to an input of the first decision feedback equalizer, the first decision feedback equalizer being configured to receive the second set of LLRs.

9. The apparatus of claim 8, wherein the decoding loop comprises an output coupled to an input of an equalizer different from the first decision feedback equalizer, the equalizer different from the first decision feedback equalizer being configured to receive the second set of LLRs.

10. The apparatus of claim 1, wherein the first decision feedback equalizer comprises:
a feed-forward filter (FFF) having an input and an output;
a second combiner having a first input, a second input, and an output;
a first decision device having an input and an output; and
a feed-back filter (FBF) having an input and an output, wherein:
the input of the FFF is coupled to the output of the first whitening filter to receive the first filtered signal generated by the first whitening filter;
the first input of the second combiner is coupled to the output of the FFF to receive a second filtered signal generated by the FFF;
the second input of the second combiner is coupled to the output of the FBF to receive a third filtered signal generated by the FBF;
the input of the first decision device is coupled to the output of the second combiner to receive a fifth symbols estimate generated by the second combiner;
the input of the FBF is coupled to the output of the first decision device to receive a sixth symbols estimate generated by the first decision device;
the FFF is configured to feed-forward filter the first filtered signal to generate the second filtered signal;
the second combiner is configured to combine the second filtered signal generated by the FFF and the third filtered signal generated by the FBF to generate the fifth symbols estimate;
the first decision device is configured to generate the sixth symbols estimate based on the fifth symbols estimate; and
the FBF is configured to filter the sixth symbols estimate to generate the third filtered signal.

11. The apparatus of claim 10, wherein the first decision device is a soft decision device configured to generate at least one log likelihood ratio.

12. The apparatus of claim 10, wherein the output of the first decision feedback equalizer is coupled to either:
the output of the first decision device, wherein the first symbols estimate comprises the sixth symbols estimate; or
the output of the second combiner, wherein the first symbols estimate comprises the fifth symbols estimate.

13. A method for noise whitening post-compensation in a receiver, the method comprising:
applying a first whitening filter to a received signal comprising symbols to generate a first filtered signal;
applying decision feedback equalization (DFE) to the first filtered signal to generate a first symbols estimate for the symbols of the received signal;
reversing an order of the symbols of the received signal to generate a reversed signal;
applying a second whitening filter to the reversed signal to generate a filtered reversed signal;
applying DFE to the filtered reversed signal to generate a reversed symbols estimate for the symbols of the reversed signal;
reversing an order of the symbols of the reversed symbols estimate to generate a second symbols estimate;
combining the first symbols estimate and the second symbols estimate to generate a third symbols estimate;
predicting noise in the received signal; and
subtracting the predicted noise from the received signal to generate a fourth symbols estimate, wherein predicting the noise in the received signal comprises:
generating a symbols decision based on the third symbols estimate;
subtracting the symbols decision from the received signal to generate noise estimates; and
applying linear predictive coding (LPC) to the noise estimates to generate the predicted noise.

14. The method of claim 13, wherein applying LPC to the noise estimates comprises calculating:

$$\hat{z}[n] = -q_1\bar{z}[n-1] - q_2\bar{z}[n-2] \ldots -q_M\bar{z}[n-M] + e[n],$$

wherein $\hat{z}$ denotes the predicted noise, $\bar{z}$ denotes the noise estimates, n denotes a symbol index for the symbols of the received signal, $q=q_1, q_2 \ldots q_M$ denotes a prediction filter, and e denotes a prediction error.

15. The method of claim 13, wherein applying DFE to the first filtered signal comprises:
feed-forward filtering the first filtered signal to generate a second filtered signal;
combining the second filtered signal and a third filtered signal to generate a fifth symbols estimate;
generating a sixth symbols estimate based on the fifth symbols estimate; and
feed-back filtering the sixth symbols estimate to generate the third filtered signal.

16. The method of claim 15, wherein generating the fifth symbols estimate based on the fourth symbols estimate comprises generating a soft symbol decision based on the fourth symbols estimate.

17. The method of claim 16, wherein generating the soft symbols decision based on the fourth symbols estimate comprises generating at least one log likelihood ratio.

* * * * *